United States Patent
Donelan et al.

(10) Patent No.: US 10,844,595 B2
(45) Date of Patent: Nov. 24, 2020

(54) EXTERIOR CEMENTITIOUS PANEL WITH MULTI-LAYER AIR/WATER BARRIER MEMBRANE ASSEMBLY AND SYSTEM AND METHOD FOR MANUFACTURING SAME

(71) Applicant: United States Gypsum Company, Chicago, IL (US)

(72) Inventors: Jeffrey William Donelan, Highland Park, IL (US); Steven Richmond, Shorewood, IL (US); Chris C. Lee, Mount Prospect, IL (US); Michael P. Shake, Johnsburg, IL (US); Jenner Omodt, Chicago, IL (US); Serguei Zelepouga, Charlotte, NC (US); Yanfei Peng, Hawthorn Woods, IL (US)

(73) Assignee: United States Gypsum Company, Chicago, IL (US)

( * ) Notice: Subject to any disclaimer, the term of this patent is extended or adjusted under 35 U.S.C. 154(b) by 15 days.

(21) Appl. No.: 16/000,357

(22) Filed: Jun. 5, 2018

(65) Prior Publication Data
US 2019/0003176 A1  Jan. 3, 2019

Related U.S. Application Data

(60) Provisional application No. 62/527,612, filed on Jun. 30, 2017.

(51) Int. Cl.
*E04B 1/76* (2006.01)
*B28B 11/24* (2006.01)
(Continued)

(52) U.S. Cl.
CPC .............. *E04B 1/76* (2013.01); *B28B 11/24* (2013.01); *B32B 13/04* (2013.01); *B32B 13/14* (2013.01);
(Continued)

(58) Field of Classification Search
CPC ........................................................ E04B 1/76
See application file for complete search history.

(56) References Cited

U.S. PATENT DOCUMENTS

| | | |
|---|---|---|
| 3,155,529 A | 11/1964 | Salvatore |
| 5,643,510 A | 7/1997 | Sucech |

(Continued)

FOREIGN PATENT DOCUMENTS

| | | | |
|---|---|---|---|
| CH | 492663 A | * 6/1970 | ............... B05D 3/02 |
| CH | 492663 A | 6/1970 | |

(Continued)

OTHER PUBLICATIONS

Chad Murphy, "Radiant Heating with Infrared", provided by Applicant (Year: 2006).*

(Continued)

*Primary Examiner* — Daniel H Lee
(74) *Attorney, Agent, or Firm* — Leydig, Voit & Mayer, Ltd.; Philip T. Petti; Pradip K. Sahu

(57) ABSTRACT

Embodiments of a system and a method for manufacturing a cementitious panel can be used to produce a cementitious panel having a multi-layer air/water barrier membrane assembly. The layers of the membrane can be built up via a series of applicator stations applying a fluid composition using roll coating, for example. Between applicator stations the applied layer of fluid composition can be subjected to drying conditions via infrared heating. To help protect from the deleterious effects of infrared heating, the cementitious panel can be conveyed through a cooling tunnel after each drying section.

20 Claims, 2 Drawing Sheets

(51) Int. Cl.
  *E04C 2/04* (2006.01)
  *C04B 41/00* (2006.01)
  *C04B 41/63* (2006.01)
  *F26B 3/30* (2006.01)
  *F26B 15/12* (2006.01)
  *C04B 41/48* (2006.01)
  *E04C 2/52* (2006.01)
  *C04B 26/02* (2006.01)
  *C04B 28/02* (2006.01)
  *B32B 13/04* (2006.01)
  *B32B 13/14* (2006.01)
  *C04B 28/04* (2006.01)
  *C04B 28/16* (2006.01)
  *C04B 111/27* (2006.01)
  *C04B 111/00* (2006.01)
  *E04B 1/62* (2006.01)
  *C04B 103/40* (2006.01)

(52) U.S. Cl.
  CPC .............. *C04B 26/02* (2013.01); *C04B 28/02* (2013.01); *C04B 28/04* (2013.01); *C04B 28/16* (2013.01); *C04B 41/009* (2013.01); *C04B 41/483* (2013.01); *C04B 41/63* (2013.01); *E04C 2/04* (2013.01); *E04C 2/528* (2013.01); *F26B 3/30* (2013.01); *F26B 15/12* (2013.01); *C04B 2103/408* (2013.01); *C04B 2111/0037* (2013.01); *C04B 2111/0062* (2013.01); *C04B 2111/00284* (2013.01); *C04B 2111/00612* (2013.01); *C04B 2111/00801* (2013.01); *C04B 2111/27* (2013.01); *E04B 1/625* (2013.01); *E04B 2001/7691* (2013.01); *E04B 2103/02* (2013.01)

(56) References Cited

U.S. PATENT DOCUMENTS

| | | |
|---|---|---|
| 5,714,001 A | 2/1998 | Savoly et al. |
| 6,342,284 B1 | 1/2002 | Yu et al. |
| 6,410,118 B1 | 6/2002 | Reicherts et al. |
| 6,632,550 B1 | 10/2003 | Yu et al. |
| 6,774,146 B2 | 8/2004 | Savoly et al. |
| 6,800,131 B2 | 10/2004 | Yu et al. |
| 7,662,221 B2 | 2/2010 | Fay |
| 8,151,537 B2 | 4/2012 | Pope |
| 2002/0045074 A1 | 4/2002 | Yu et al. |
| 2004/0231916 A1 | 11/2004 | Englert et al. |
| 2005/0019618 A1 | 1/2005 | Yu et al. |
| 2014/0261954 A1 | 9/2014 | Dubey et al. |
| 2014/0272404 A1 | 9/2014 | Shake et al. |

FOREIGN PATENT DOCUMENTS

| | | |
|---|---|---|
| GB | 2201104 A | 8/1988 |
| WO | WO 2003/037584 A2 | 5/2003 |

OTHER PUBLICATIONS

Murphy et al., "Radiant Heating With Infrared a Technical Guide to Understanding and Applying Infrared Heaters" Retrieved from the Internet: URL:https://www.watlow.com/en/resources-and-support/technical-library/tutorials-andtraining (2006).

European Patent Office, International Search Report and Written Opinion in International Application No. PCT/US2018/040532 (dated Oct. 25, 2018).

* cited by examiner

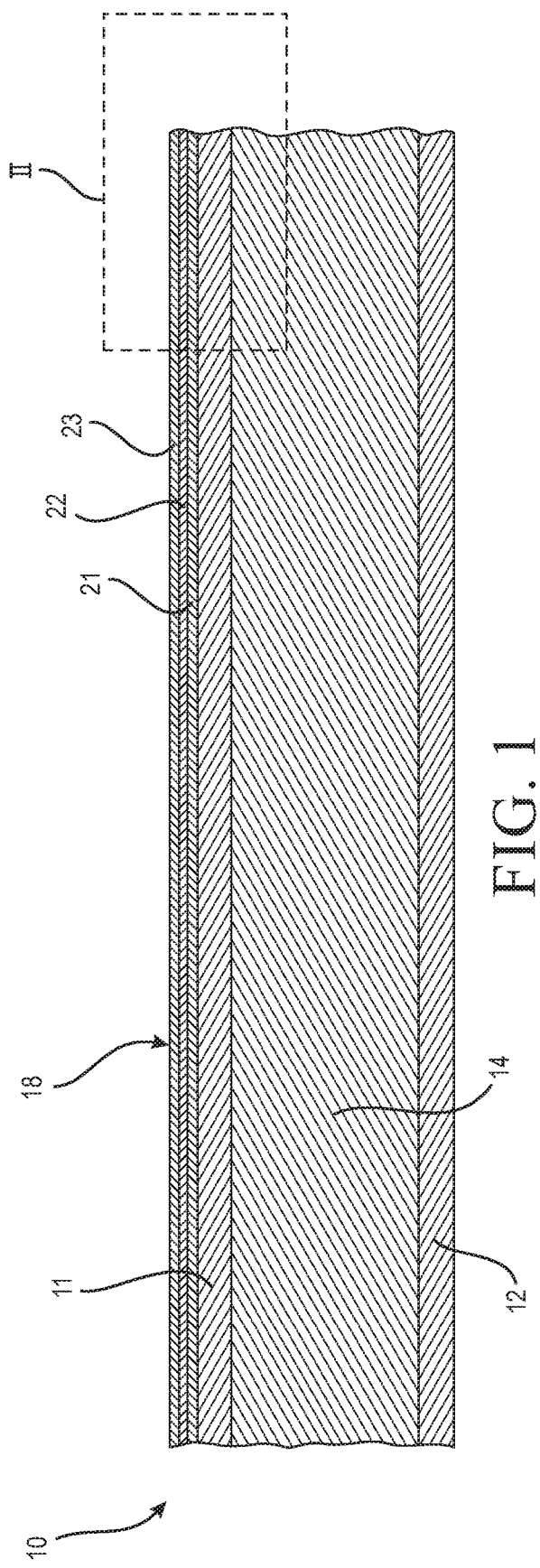
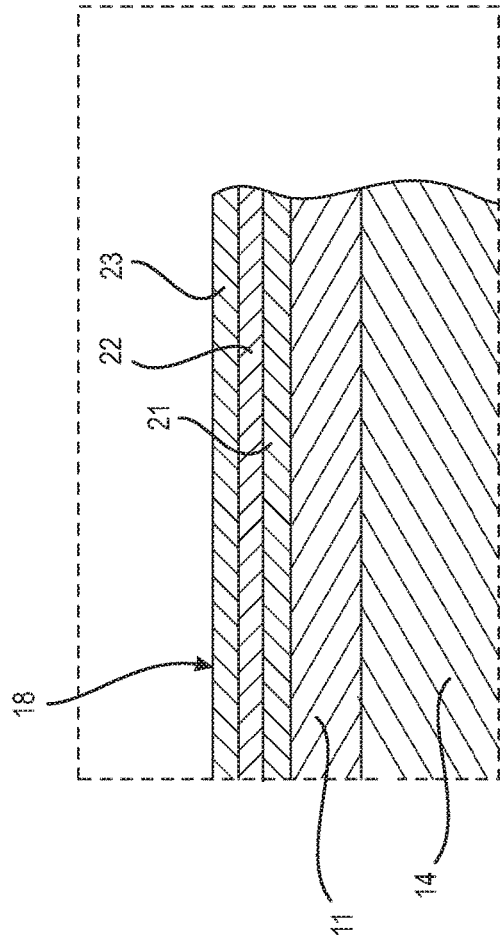
FIG. 1
FIG. 2

EXTERIOR CEMENTITIOUS PANEL WITH MULTI-LAYER AIR/WATER BARRIER MEMBRANE ASSEMBLY AND SYSTEM AND METHOD FOR MANUFACTURING SAME

CROSS-REFERENCE TO RELATED APPLICATION

This patent application claims the benefit of priority to U.S. Provisional Patent Application No. 62/527,612, filed Jun. 30, 2017, and entitled, "Exterior Cementitious Panel With Multi-Layer Air/Water Barrier Membrane Assembly and System and Method for Manufacturing Same," which is incorporated in its entirety herein by this reference.

BACKGROUND

The present disclosure relates in general to a building exterior cementitious panel and, more particularly, to an exterior cementitious panel that includes an integrated air/water barrier membrane and systems and methods for making the same.

Cementitious articles, such as gypsum board and cement board, are useful in a variety of applications, some of which require a degree of water resistance. Traditional paper-faced cementitious articles do not always perform well under high moisture conditions, or upon exposure to the outdoors. Thus, for such applications, it is often desirable to use a cementitious panel that is faced with a glass or polymer-based fiber mat rather than paper. The cementitious core can include additives that improve the water resistance of the core material itself.

The manufacturing process of cementitious articles often requires the facing material to be sufficiently permeable such that excess water can be removed from the cementitious slurry during the drying process. However, the permeability of the fibrous mat facing material also reduces the water-resistance of the cementitious panel because it allows water to penetrate the mat and contact the cementitious core after the panel is installed in an exterior application.

An air/water barrier has been included as part of a building envelope barrier system for the desired effect of stopping the unintended passage of air, water, and other elements into and out of a building enclosure. Exterior air/water barrier sheeting (also called "house wrap") can be difficult to install, though. As an initial matter, installing sheets occurs in the field after the panels have been assembled as a building structure. Environmental conditions (e.g., wind, temperature, rain, etc.) can create significant obstacles for the successful installation of sheet materials. Moreover, the sheet backing typically provides a poor bonding surface for other construction materials, thereby making sheets difficult to adhere.

A fluid-applied air/water barrier membrane has also been applied in situ to cementitious panels that are part of a building assembly as an alternative to sheet membrane barrier products. Fluid-applied membrane barrier products can be applied by being sprayed, hand-rollered, or troweled, and can be faster to install than sheet membrane barrier products at the jobsite. The typical installation crew requirements are smaller than with sheet membrane barrier installations. Fluid-applied membranes are typically spray applied on the jobsite, which greatly increases the production rate compared to the application of sheeting. However, issues with the application can occur, such as an incorrect amount of material being applied due to applicator error, equipment problems, and/or environmental conditions (e.g., wind, temperature, rain, etc.). Such issues impact not only the quality and durability of the air/water barrier installation but can also cause significant additional costs to be incurred to clean up and repair damage to items adjacent the application of the barrier as a result of overspray.

In addition, a separate crew of installers is frequently used for installing the barrier membrane that is different from the crew that installed the cementitious panels. The use of separate installation crews can increase labor costs, cause delays, and increase the logistical complexity during the construction process. Conventional methods for installing the air/water barrier require separate crews which install the sheathing first, then finish the joints, and then install the water resistant barrier and the air barrier yet in the next and separate round.

There is a continued need in the art to provide additional solutions to enhance the use of cementitious panels. For example, there is a continued need for techniques for preparing such articles with water penetration resistance. There continues to be a need for providing a building system with an air/water barrier that is conveniently installed with reduced complexity and/or labor costs.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is not limited or constrained by the ability of any disclosed feature to solve any specific problem noted herein.

SUMMARY

In one aspect, the present disclosure is directed to embodiments of a cementitious panel that includes a multi-layer air/water barrier membrane assembly. In another aspect, the present disclosure describes embodiments of a system for manufacturing a cementitious panel that includes a multi-layer air/water barrier membrane assembly. In still another aspect, the present disclosure is directed to embodiments of a method of manufacturing a cementitious panel that includes a multi-layer air/water barrier membrane assembly.

Further and alternative aspects and features of the disclosed principles will be appreciated from the following detailed description and the accompanying drawings. As will be appreciated, the systems and techniques for manufacturing a cementitious panel that includes a multi-layer air/water barrier membrane assembly, and the panels themselves, that are disclosed herein are capable of being carried out and used in other and different embodiments, and capable of being modified in various respects. Accordingly, it is to be understood that both the foregoing general description and the following detailed description are exemplary and explanatory only and do not restrict the scope of the principles disclosed herein.

BRIEF DESCRIPTION OF THE DRAWINGS

FIG. 1 is a fragmentary, schematic transverse sectional view of an embodiment of a cementitious panel constructed in accordance with principles of the present disclosure.

FIG. 2 is an enlarged detail view taken from FIG. 1, as indicated by Rectangle II, illustrating a multi-layer air/water barrier membrane assembly of the cementitious panel of FIG. 1.

Figure 3:
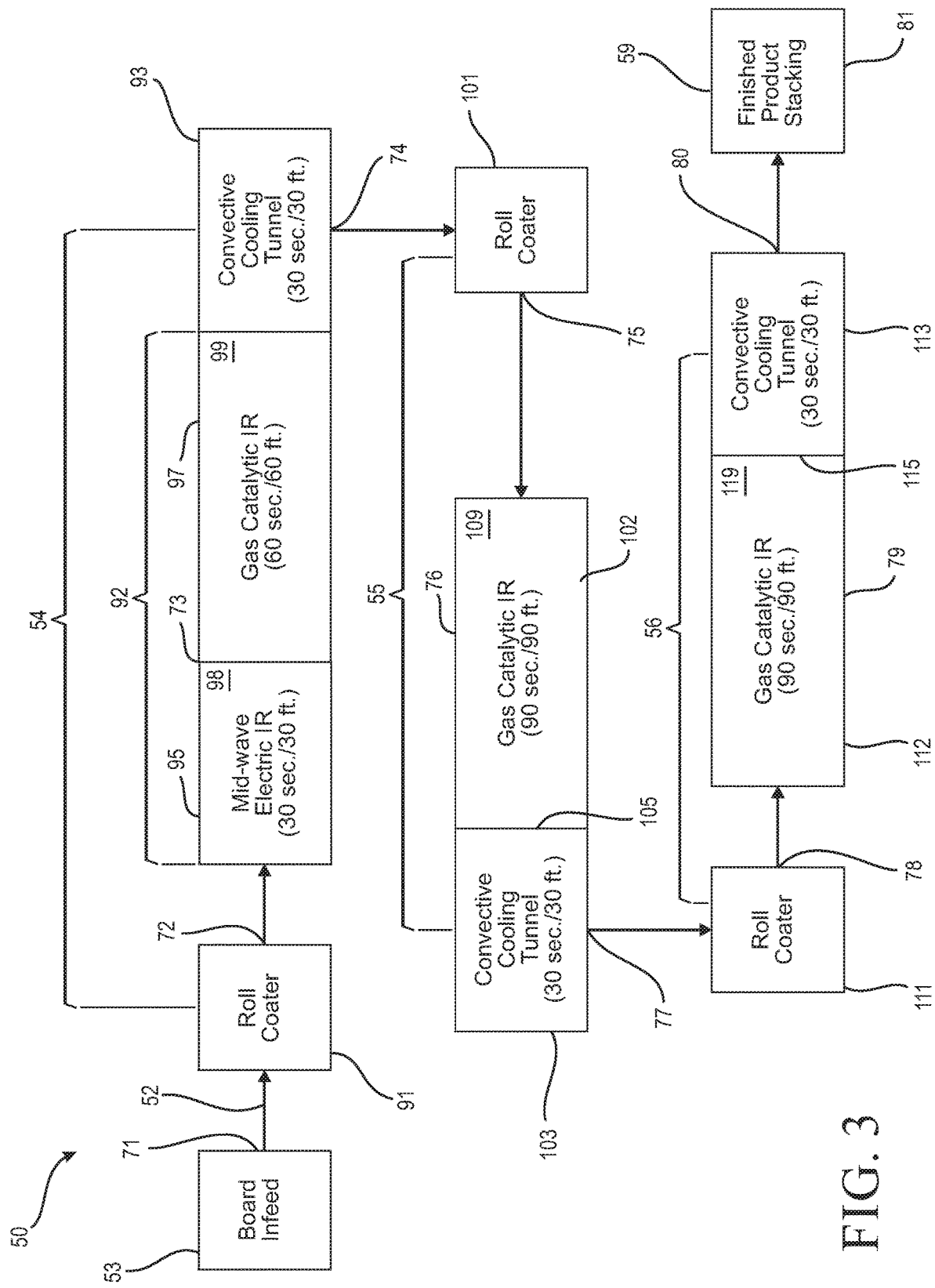
FIG. 3 is a schematic, diagrammatic view of an embodiment of a system for manufacturing a cementitious panel including a multi-layer air/water barrier membrane assembly which is constructed in accordance with principles of the present disclosure, the system including an embodiment of means for applying a multi-layer air water barrier membrane assembly to a cementitious panel.

It should be understood that the drawings are not necessarily to scale and that the disclosed embodiments are illustrated diagrammatically and in partial views. In certain instances, details which are not necessary for an understanding of this disclosure or which render other details difficult to perceive have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for manufacturing a cementitious panel that include means and steps for applying a multi-layer air/water barrier membrane assembly that can be used in connection with the construction of various exteriors for a building, for example. In embodiments of systems and methods for manufacturing a cementitious panel following principles of the present disclosure, a series of layer production subassemblies each including an applicator, a dryer, and a cooler, is used to adhere the layers of the air/water barrier membrane assembly in quick succession to promote the ready manufacture of the cementitious panel in a production environment.

The present disclosure provides various embodiments of an exterior cementitious panel that is integrated with an air/water barrier membrane assembly prior to it being installed in a building assembly. In embodiments, the air/water barrier membrane assembly is integrally connected to at least one cover sheet of the cementitious panel such that the cover sheet is interposed between a cementitious core of the panel and the air/water barrier membrane assembly. In embodiments, the air/water barrier membrane assembly includes a plurality of dried layers in a stacked arrangement.

A cementitious panel with an integrated air/water barrier membrane assembly can provide an easy to install single panel that eliminates the need to serially install a separate air and water resistant barrier at the jobsite after assembly of a group of cementitious panels into a building assembly. By doing so, the number of steps required to complete the building envelope are reduced, substantially reducing the time and labor required to meet the air/water barrier system performance requirements for a building enclosure. This disclosure also provides embodiments related to methods in which cementitious panels with air/water barrier membrane assemblies are produced with uniform and monolithic barrier properties in a controlled, production environment, thereby reducing problems associated with having an insufficient amount of barrier material applied in the field. Additionally, applying the air/water barrier membrane assembly to the exterior cementitious panel in a controlled, automated factory setting as provided in this disclosure helps ensure that the membrane assembly is applied in a consistent manner, thereby helping to provide a consistent minimum coating thickness with good adhesion bond between the air/water barrier membrane assembly and the cementitious panel substrate.

In embodiments of a system for manufacturing a cementitious panel constructed according to principles of the present disclosure, the system includes a conveyor, a first applicator, a first dryer, a second applicator, and a second dryer. The system can be used to manufacture a cementitious panel following principles of the present disclosure.

The conveyor is adapted to convey the cementitious panel along a machine direction from a first applicator station to a stacking position. The conveyor includes a first dryer section, a second applicator station, and a second dryer section disposed along the machine direction between the first applicator station and the stacking position.

The first applicator is positioned at the first applicator station and is adapted to apply a first layer of fluid composition to the cover sheet. The first dryer is positioned downstream of the first applicator station along the machine direction at the first dryer section. The first dryer has a first infrared emitter system adapted to dry the first layer of fluid composition to form a first membrane layer.

The second applicator is positioned at the second applicator station downstream of the first dryer section along the machine direction and is adapted to apply a second layer of fluid composition over the first membrane layer. The second dryer is positioned downstream of the second applicator station along the machine direction at the second dryer section. The second dryer has a second infrared emitter system adapted to dry the second layer of fluid composition to form a second membrane layer.

The first dryer section includes a first zone and a second zone disposed downstream of the first zone along the machine direction. The first infrared emitter system has a first infrared emitter subassembly disposed in the first zone and a second infrared emitter subassembly disposed in the second zone. The first infrared emitter subassembly has a first power density maximum operational value, and the second infrared emitter subassembly having a second power density maximum operational value which is different from the first power density maximum operational value.

In embodiments of a method of manufacturing a cementitious panel following principles of the present disclosure, the method includes applying, at a first application station, a first layer of fluid composition to a cover sheet of the cementitious panel. The first layer is subjected to drying conditions via infrared heating in a first drying section with a first power density profile to form a first membrane layer.

A second layer of fluid composition is applied, at a second application station, over the first membrane layer. The second application station is disposed in spaced relationship to the first application station with the first drying zone interposed therebetween. The second layer is subjected to drying conditions via infrared heating in a second drying section with a second power density profile to form a second membrane layer. The second power density profile is different from the first power density profile.

Turning now to the Figures, an embodiment of a cementitious panel 10 constructed according to principles of the present disclosure is shown in FIG. 1. The illustrated cementitious panel 10 includes a first cover sheet 11, a second cover sheet 12, a cementitious core 14, and an air/water barrier membrane assembly 18. The cementitious core 14 is interposed between the first and second cover sheets 11, 12. The air/water barrier membrane assembly 18 is integrally attached to the first cover sheet 11 such that the first cover sheet 11 is interposed between the cementitious core 14 and the integrated air/water barrier membrane assembly 18.

In embodiments, an exterior cementitious panel constructed according to principles of the present disclosure comprises a fluid-applied air/water barrier membrane assembly adhered to at least one surface of the panel. In embodiments, the second cover sheet 12 can be omitted.

In embodiments, a cementitious panel can include any suitable inorganic core material intended for exterior applications. In particular, the cementitious core 14 can comprise any suitable cementitious material, substance, or composition, along with any suitable additives. Non-limiting examples of materials that can be used in the cementitious core include: Portland cement; sorrel cement; slag cement; fly ash cement; calcium alumina cement; water-soluble calcium sulfate anhydrite; calcium sulfate α-hemihydrate; calcium sulfate β-hemihydrate; natural, synthetic, or chemically-modified calcium sulfate hemihydrates; calcium sulfate dihydrate ("gypsum," "set gypsum," or "hydrated gypsum"); and combinations thereof. As used herein, the term "calcium sulfate material" refers to any of the forms of calcium sulfate referenced above. In certain preferred embodiments, the cementitious core comprises a calcium sulfate material, Portland cement, or a mixture thereof. In some embodiments, the cementitious core 14 comprises gypsum. Examples of suitable cementitious panels for use in embodiments of the present disclosure include, e.g., those commercially-available from United States Gypsum Corp. of Chicago, Ill., under the trade names SHEETROCK®, SHEETROCK FIRECODE®, SECUROCK®, FIBEROCK®, and DUROCK®.

The cementitious core 14 can comprise additives, such as any suitable additives used to produce cementitious articles (e.g., gypsum board or cement board) as known to those skilled in the art. Suitable additives include, without limitation, structural additives such as mineral wool, continuous or chopped glass fibers (also referred to as fiberglass), perlite, clay, vermiculite, calcium carbonate, polyester, and paper fiber. Chemical additives include, e.g., foaming agents, fillers, accelerators, sugar, enhancing agents (e.g., phosphates, phosphonates, borates), retarders, binders (e.g., starch and latex), colorants, fungicides, and biocides. In certain embodiments, the cementitious core 14 further comprises metal fibers, cellulose fibers, mineral fibers, glass fibers, polymer fibers, carbon fibers, or a combination thereof. Examples of the use of some of these and other additives are described, for instance, in U.S. Pat. Nos. 6,342,284; 6,410,118; 6,632,550; 6,800,131; 5,643,510; 5,714,001; and 6,774,146, and U.S. Patent Application Publication Nos. 2004/0231916; 2002/0045074; 2005/0019618; and 2014/0261954, which disclosures are each hereby incorporated herein by reference.

In embodiments, the cementitious core 14 is covered by at least one substrate 11, and in some embodiments by two substrates 11, 12, in an overlying manner relative to the core 14 on opposing faces thereof. In other words, in embodiments, the cementitious core 14 is sandwiched between two substrates. The substrate can be a cover sheet, such as a paper cover sheet or a mat, for example. In embodiments, various types of paper cover sheets as known to those skilled in the art (e.g., manila, kraft, polymer, etc.) can be used in the present invention. Multi-ply papers can be used. In embodiments, the paper cover sheet can be treated with a chemical or physical additive to impart a property, such as water-proof, fire-proof, antifungal, and/or antimicrobial properties. In embodiments, the cover sheet is a paper cover sheet having a weight of about 40 to about 65 lb./msf (thousand square feet).

In other embodiments, the cover sheets 11, 12 comprise fibrous mats, as known to those skilled in the art. The mat can comprise any suitable type of polymer fiber, mineral fiber, or combination thereof. Non-limiting examples of suitable fibers include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and combinations thereof. Furthermore, the fibers of the mat can be hydrophobic or hydrophilic and coated or uncoated. In embodiments, the fibers used in the mat-type cover sheets 11, 12 can be selected based, at least in part, on the type of application in which the cementitious sheathing panel 10 is to be used. For example, when the cementitious panel 10 is used in an application where heat or fire resistance is desired, appropriate heat-resistant and/or fire-resistant fibers can be included in the fibrous mat.

In embodiments, the fibrous mat used for the cover sheets 11, 12 can be woven or non-woven. Non-woven mats used for the cover sheets 11, 12 can comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and combinations thereof. Suitable fibrous mats used for the cover sheets 11, 12 can include commercially-available mats used as facing materials for cementitious panels, as known to those skilled in the art.

Referring to FIGS. 1 and 2, in embodiments, the air/water barrier membrane assembly 18 includes a plurality of membrane layers 21, 22, 23 that are built up in succession one on top of the other. The membrane layers 21, 22, 23 of the air/water barrier membrane assembly 18 cooperate together to produce an integral, monolithic barrier membrane in the finished cementitious panel 10.

In the illustrated embodiment, the air/water barrier membrane assembly 18 includes three membrane layers 21, 22, 23 that are each substantially the same thickness. In other embodiments, the air/water barrier membrane assembly 18 can have a different number of membrane layers 21, 22, 23. In embodiments, the air/water barrier membrane assembly 18 can include at least two membrane layers 21, 22. In embodiments, the air/water barrier membrane assembly 18 can include at least one layer having a thickness that is different from at least one other layer thereof. In embodiments, the thicknesses of the membrane layers 21, 22, 23 of the air/water barrier membrane assembly 18 can be constructed to meet a desired aggregate thickness specification (e.g., 0.020 inches thick).

The air/water barrier membrane assembly 18 can be prepared by any suitable method. In general, a series of layers of fluid composition can be successively applied to at least one surface (e.g., the exterior facing surface) of an exterior cementitious panel. The fluid composition can be any suitable composition, and is in the form of a liquid polymer formulation in some embodiments. An applying step can comprise any suitable method of applying the liquid polymer formulation to a surface of the sheathing panel. Such methods are known in the art and include, e.g., spraying, rolling (e.g., pressure rolling), troweling, brushing, wiping, dipping, soaking, and/or impregnating the surface of the panel with the fluid composition. Once the fluid composition is applied in a layer, the fluid composition dries (which includes dries, solidifies, hardens, and/or cures) on the surface to provide a membrane layer of the assembly 18 that has air- and/or moisture-proof properties. A drying step can be performed using an infrared drying system for a specified amount of time to promote drying of each membrane layer to achieve the desired level of tackiness. A cooling step can be performed after the drying step to ready the cementitious panel to receive a successive layer of the membrane assembly 18 and/or to be stacked at a stacking station of the manufacturing facility. In embodiments, after drying, the liquid polymer formulation forms a rubberized (elastomeric) membrane assembly 18 on at least one exterior surface of the cementitious panel 10.

In embodiments, the fluid composition used to produce the air/water barrier membrane assembly 18 can be any suitable composition used in fluid-applied membranes, such as those described in U.S. Patent Application Publication No. US2014/0272404, which is hereby incorporated herein by this reference. In embodiments, a suitable formulation for an air/water barrier fluid composition meets or exceeds the minimum requirements set forth in CAN/ULC-S741 ("Standard for Air Barrier Materials—Specification") and tested in accordance with by ASTM E2178 ("Standard Test Method for Air Permeance of Building Materials"). Such formulations include those that prevent or inhibit air infiltration/exfiltration and water penetration through an exterior cementitious panel 10 with an integrated air/water barrier membrane assembly 18, while the panel still remains permeable to water vapor. Other suitable air/water barrier membrane formulations include those that prevent or inhibit air infiltration/exfiltration through the panel 10 and also inhibit permeability of the panel to water vapors.

In embodiments, the formulation of the fluid composition of at least one of the membrane layers 21, 22, 23 of the air/water barrier membrane assembly 18 is different from at least one other of the membrane layers 21, 22, 23 thereof. In embodiments, each of the membrane layers 21, 22, 23 of the air/water barrier membrane assembly 18 is made from a fluid composition having a different formulation than the other layers 21, 22, 23 thereof.

In embodiments, the fluid composition comprises a liquid polymer formulation having one or more materials (e.g., polymers) that serve as a polymer binder and provide a self-gasketing effect after the fluid composition has dried. Non-limiting examples of a liquid polymer formulation suitable for a cementitious panel 10 with an air/water barrier membrane assembly 18 constructed according to principles of the present disclosure includes polyacrylate (e.g., polymers and copolymers based on methacrylate, ethyl acrylate, ethyl methylacrylate, butylacrylate, butyl methacrylate, 2-chloroethylvinyl ether, 2-ethylhexyl acrylate, and hydroxyethyl methacrylate), polystyrene, polybutadiene, poly(butadiene co-styrene), polyisoprene, polyacrylonitrile butadiene, polychloroprene, polyvinyl acetate, polyvinyl chloride, polyurethane, polyvinyl acetate, silicone emulsion, and combinations thereof. Examples of fluid-applied membranes are exemplified by, e.g., U.S. Pat. Nos. 8,151,537 and 7,662,221, which disclosures are hereby incorporated by reference herein.

In certain embodiments, the formulation of the fluid composition used in the air/water barrier membrane assembly 18 is in the form of a liquid emulsion (e.g., a liquid polymer emulsion), such as a water-based elastomeric emulsion (e.g., a water-based acrylic emulsion) or an oil-based elastomeric emulsion (e.g., a rubberized (elastomeric) emulsion). Solvents used in the emulsion can be water, organic solvent, or a combination thereof. Examples of suitable organic solvents include mineral spirits, mineral oil, xylene, and naphtha.

In embodiments, a cementitious panel 10 with an air/water barrier membrane assembly 18 constructed according to principles of the present disclosure comprises a multi-layer membrane which was prepared from a formulation comprising an acrylic emulsion. At least in some embodiments, a cementitious panel 10 with an air/water barrier membrane assembly 18 constructed according to principles of the present disclosure includes a membrane layer prepared from a formulation comprising 5 to 80 wt. % of a polyacrylate. At least in some embodiments, a cementitious panel 10 with an air/water barrier membrane assembly 18 constructed according to principles of the present disclosure includes a membrane layer prepared from a formulation comprising 30 to 70 wt. % of a polyacrylate. At least in some embodiments, a cementitious panel 10 with an air/water barrier membrane assembly 18 constructed according to principles of the present disclosure includes a membrane layer prepared from a formulation comprising 40 to 60 wt. % of a polyacrylate.

In embodiments, a cementitious panel 10 with an air/water barrier membrane assembly 18 constructed according to principles of the present disclosure comprises a membrane layer prepared from a formulation comprising polyurethane. At least in some embodiments, a cementitious panel 10 with an air/water barrier membrane assembly 18 constructed according to principles of the present disclosure includes a membrane layer prepared from a formulation comprising 5 to 50 wt. % of polyurethane. At least in some embodiments, a cementitious panel 10 with an air/water barrier membrane assembly 18 constructed according to principles of the present disclosure includes a membrane layer prepared from a formulation comprising 10 to 40 wt. % of polyurethane. At least in some embodiments, a cementitious panel 10 with an air/water barrier membrane assembly 18 constructed according to principles of the present disclosure includes a membrane layer prepared from a formulation comprising a combination of polyurethane and another polymer selected from at least one of the following: silicone and a polyacrylate. At least in some embodiments, a cementitious panel 10 with an air/water barrier membrane assembly 18 constructed according to principles of the present disclosure includes a membrane layer prepared from a formulation comprising a styrene co-polymer.

In embodiments, a cementitious panel 10 with an air/water barrier membrane assembly 18 constructed according to principles of the present disclosure includes a membrane layer prepared from a formulation comprising an acrylic latex, an acrylic styrene co-polymer, and/or a styrene-butadiene dispersion. In embodiments, these polymeric binders can be used in the amount from 30 to 70% by weight in the formulation of the fluid composition. In some embodiments, a polymeric binder can be selected from the following commercially available binders: PLIOTEC EL-25 (Acrylic Elastomeric Latex) from Omnova, ACRONAL S400 (Aqueous Plasticizer-Free Copolymer Dispersion of Acrylic Acid Ester and Styrene) from BASF, UCAR 9176 (Styrene Acrylic Copolymer) from DOW, RHOPLEX 2620 (100% Acrylic Polymer) from DOW or BUTONAL NS 175 (High Solids, Cold Polymerized Anionic Styrene-Butadiene Dispersion) from BASF.

In some embodiments, a cementitious panel 10 with an air/water barrier membrane assembly 18 constructed according to principles of the present disclosure includes a membrane layer prepared from a formulation comprising a polymer emulsion and a dispersant. In embodiments, various dispersants can be used to stabilize the emulsion, such as polyvinyl alcohols, cellulose and derivatives thereof, vinylpyrrolidone-containing copolymers, ethoxylated mono-, di- and trialkylphenols, ethoxylated fatty alcohols and alkali metal and ammonium salts of alkyl sulfates of sulfuric acid, monoesters of ethoxylated alkanols and of ethoxylated alkylphenols of alkylsulfonic acids and of alkylarylsulfonic acids, the alkali metal and/or ammonium salts of dodecylbenzenesulfonic acid, and the alkali metal and/or ammonium salts of the sulfuric acid monoester of ethoxylated dodecanol. In embodiments, dispersants can be added to the formulation of the fluid composition in an amount from about 0-10 wt. % (e.g., between about 1-9 wt. %, between about 2-7 wt. %, between 3-6 wt. %, etc.) in the formulation of the fluid composition.

In embodiments, a suitable dispersant for a formulation of the fluid composition used to form at least one membrane layer of the membrane assembly 18 includes a solution of a high molecular weight block copolymer with pigment affinic groups, solution of an ammonium salt of an acrylate copolymer, anionic polyelectroyte, potassium tripolyphosphate and alkylol ammonium salt of a copolymer with acidic groups. These dispersants can be used in an amount from 0-10 wt. % and preferably from 0.1-5 wt. % in the formulation of the fluid composition. In some embodiments, a dispersant can be selected from the following commercially-available dispersants: DISPERBYK-190 (solution of a high molecular weight block copolymer with pigment affinic groups) from BYK, BYK-156 (solution of an ammonium salt of an acrylate copolymer) from BYK, TAMOL 851 (anionic polyelectroyte) from DOW, Potassium Tri polyphosphate (triphosphoric Acid, pentapotassium salt) from INNOPHOS, DISPERBYK-180 (alkylol ammonium salt of a copolymer with acidic groups) from BYK.

In embodiments, a cementitious panel 10 with an air/water barrier membrane assembly 18 constructed according to principles of the present disclosure includes a membrane layer prepared from a formulation comprising one or more additives to further enhance the performance of the barrier material. Suitable additives include, e.g., petroleum asphalt, limestone, calcium carbonate, a silane (e.g., diaminosilane, trimethoxy vinylsilane), a glycol (e.g., ethylene glycol, propylene glycol, dipropylene glycol monobutyl ether), a tackifier (e.g., a rosin or rosin derivative, such as wood rosin, a terpene or modified terpene, an aliphatic, cycloaliphaticm or aromatic resin), an adhesion promoter, a curing catalyst, a crosslinking agent, a termiticide, a fungal growth inhibiting agent (e.g., 2-(4-thiazolyl) benzimidazole, silver zeolyte, zinc oxide and zinc pyrithione), a filler (e.g., kaolin clay, mica, heavy spar, talc, sand, quartz flour, chalk, titanium dioxide, silica, fly ash), and/or a phase change material.

In embodiments, a cementitious panel 10 with an air/water barrier membrane assembly 18 constructed according to principles of the present disclosure includes a membrane layer prepared from a formulation comprising a polymeric binder described above and calcium carbonate which can be used in the amount from 20 to 50% by weight in the formulation of the fluid composition. Suitable commercial sources of calcium carbonate include, but are not limited to, THIXO-CARB 500™ (Precipitated Calcium Carbonate) from Specialty Minerals, ULTRAFLEX100™ (Precipitated Calcium Carbonate) from Specialty Minerals, HUBER-CARB Q6™ (Calcium Carbonate) from Huber Engineered Materials, OMYACARB 100-PT™ (Calcium Carbonate) from Omya, HUBERCARB Q325™ (Calcium Carbonate) from Huber Engineered Materials and NEOLIGHT SS™ (Precipitated Coated Calcium Carbonate) from Takehara Kagaku Kogyo Co.

In embodiments, a cementitious panel 10 with an air/water barrier membrane assembly 18 constructed according to principles of the present disclosure includes a membrane layer prepared from a formulation comprising a polymeric binder as described above, calcium carbonate, and at least one or more additives such as a defoamer, pigment, thickener, preservative, pH adjuster, emulsion stabilizer, wetting and leveling agent and cross linker.

In embodiments, suitable defoamers for use in the formulation of the fluid composition used to form at least one membrane layer include, but are not limited to a mixture of paraffinic mineral oils and hydrophobic components, molecules compounded in an enhanced mineral-oil system, a solution of a polyether-modified polydimethylsiloxane, and a mixture of foam-destroying polysiloxanes and hydrophobic solids in polyglycol. These defoamers can be used in the amount from 0.1 to 5 wt % in the formulation of the fluid composition. Suitable commercial sources for a defoamer include BYK033™ (mixture of paraffinic mineral oils and hydrophobic components) from BYK, FOAMSTAR ST 2410™ aka. FOAMSTAR A10™ (molecule compounded in an enhanced mineral-oil system) from BASF, BYK019™ (solution of a polyether-modified polydimethylsiloxane) from BYK, BYK-021™ (mixture of foam-destroying polysiloxanes and hydrophobic solids in polyglycol) from BYK.

In embodiments, a cementitious panel 10 with an air/water barrier membrane assembly 18 constructed according to principles of the present disclosure includes a membrane layer prepared from a formulation comprising a suitable pigment including, but not limited to, titanium dioxide, zinc oxide, carbon black, micronized precipitated silica, talc and combinations thereof. In embodiments, a pigment can be used in the amount from 0.1% to 10% by weight in the formulation of the fluid composition. Suitable commercial sources for a pigment include HUNTSMAN TR93™ (Titanium Dioxide) from Maroon Inc.; ZOCO 101™ (Zinc Oxide) from Zochem Inc.; SOLTEX ACE BLACK™ (Carbon Black) from Soltex, Inc.; ZEOTHIX 265™ (Micronized precipitated silica) from Huber Engineered Materials, and SIERRALITE 402S™ (Talc) from Imerys Group.

In embodiments, a cementitious panel 10 with an air/water barrier membrane assembly 18 constructed according to principles of the present disclosure includes a membrane layer prepared from a formulation comprising a suitable thickener, including, but not limited to, at least one of the following: hydroxyethylcellulose, acrylic thickener, anionic inverse emulsion thickener, HASE, and hydrophobically-modified alkali swellable acrylic emulsion. A thickener can be used in the formulation of the fluid composition in an amount from 0.1% to 5% by weight in the formulation of the fluid composition. Suitable commercial sources for a thickener include NATROSOL 250 HBR™ (Hydroxyethylcellulose) from Ashland Inc., ACRYSOL ASE-95NP™ (Alkali Soluble, Acrylic Thickener) from DOW, TEXIPOL 63-510™ (Anionic Inverse Emulsion Thickener) from Scott Bader Co. Ltd., POLYPHOBE 106HE™ (HASE) from Arkema Group, and SOLTHIX A100™ (Hydrophobically Modified Alkali Swellable Acrylic Emulsion) from Lubrizol Corp.

In embodiments, a cementitious panel 10 with an air/water barrier membrane assembly 18 constructed according to principles of the present disclosure includes a membrane layer prepared from a formulation comprising a suitable preservative, including, but not limited to, at least one of the following: 2[(Hydroxymethyl)amino]-2-methylpropanol, 3-iodo-2-propnynyl butyl carbamate, n-(3,4-Dichlorophenyl)-n,n-Dimethlyurea, 1,2 benzisothiazolin-3-one and tetrachloroisophthalonitrile. In embodiments, a thickener can be used in an amount from 0.1% to 5% by weight in the formulation of the fluid composition. Suitable commercial sources for a thickener include TROYSAN 136™ (2[(Hydroxymethyl)amino]-2-methylpropanol) from Troy Corporation, POLYPHASE AF1™ (3-iodo-2-propnynyl butyl carbamate) from Troy Corporation, POLYPHASE 663™ (n-(3,4-Dichlorophenyl)-n,n-Dimethlyurea) from Troy Corporation, MERGAL 758™ (1,2 benzisothiazolin-3-one) from Troy Corporation and NUOCIDE 404D™ (Tetrachloroisophthalonitrile) from Ashland Inc.

In embodiments, a cementitious panel 10 with an air/water barrier membrane assembly 18 constructed according to principles of the present disclosure includes a membrane layer prepared from a formulation comprising a suitable pH adjuster, including, but not limited to, at least one of the following: calcium hydroxide, sodium hydroxide, potassium hydroxide, 30% aqua ammonia and 2-Amino-2-methyl-1-propanol. A pH adjuster can be used in an amount from 0.1% to 5% by weight in the formulation of the fluid composition. Suitable commercial sources for a pH adjuster include Calcium Hydroxide (Calcium Hydroxide) from Jost Chemical, Caustic Soda (Sodium Hydroxide Solution) from OXYChem, Potassium hydroxide (Potassium Hydroxide) from Chem One Ltd., Ammonia Hydroxide Solution (30% Aqua Ammonia) from Tanner Industries, and AMP 95 (2-Amino-2-methyl-1-propanol) from Angus Chemical Co.

In embodiments, a cementitious panel 10 with an air/water barrier membrane assembly 18 constructed according to principles of the present disclosure includes a membrane layer prepared from a formulation comprising a suitable emulsion stabilizer, including, but not limited to, at least one of the following: bentonite clay, a high molecular weight cross-linked copolymer of acrylic acid and C10-C30 alkyl acrylate, nonionic octylphenol ethoxylate surfactant, tall oil resin and natural resin extract. An emulsion stabilizer can be used in an amount from 0.1% to 5% by weight in the formulation of the fluid composition. Suitable commercial sources for an emulsion stabilizer include OPTIGEL LX™ (Bentonite Clay) from BYK, PEMUIEN 1622™ (a high molecular weight, cross-linked copolymer of acrylic acid and C10-C30 alkyl acrylate) from Lubrizol Corp., TRITON X405™ (nonionic, octylphenol ethoxylate surfactant) from DOW Chemical Company, SYLVAROS™ NCY (Tall Oil Resin) from Arizona Chemical Co., LLC, and VINSOL™ SOAP (Natural Resin extract) from Pinnova Inc.

In embodiments, a cementitious panel 10 with an air/water barrier membrane assembly 18 constructed according to principles of the present disclosure includes a membrane layer prepared from a formulation comprising a suitable wetting and/or a leveling agent, including, but not limited to, at least one of the following: sulfosuccinate, polyether modified siloxane, urea modified polyurethane, modified urea ammonium salt of an acrylate copolymer. A wetting and/or leveling agent can be used in an amount from 0.1% to 5% by weight in the formulation of the fluid composition. Suitable commercial sources for a wetting and leveling agent include AEROSOL™ LF-4 (Proprietary Sulfosuccinate Blend) from Cytec Industries, BYK-349 (Polyether Modified Siloxane), BYK-425 (Urea Modified Polyurethane), BYK-420 (Modified Urea), and BYK-154 (Ammonium Salt of an Acrylate Copolymer) from BYK.

In embodiments, a cementitious panel 10 with an air/water barrier membrane assembly 18 constructed according to principles of the present disclosure includes a membrane layer prepared from a formulation comprising a suitable cross linker, including, but not limited to, at least one of the following: zinc oxide, zinc metal ions, stabilized ammonium zirconium carbonate containing anionic hydroxylated zirconium polymers and epoxy functional silane. A cross linker can be used in an amount from 0.1% to 5% by weight in the formulation of the fluid composition. Suitable commercial sources for a cross linker include Zinc Oxide (zinc Oxide) from US Zinc, ZIMPLEX™ 15 (Zinc metal ions) from Munzing, BACOTE™ 20 (clear alkaline solution of stabilized ammonium zirconium carbonate, containing anionic hydroxylated zirconium polymers) from Melchemical Inc., OXYLINK™ 3404 (Aqueous formulation of inorganic particles including zinc oxide) from Buhler Group, and SILANE™ A-187 (Epoxy functional silane) from Momentive Performance Materials Inc.

In embodiments, a cementitious panel 10 with an air/water barrier membrane assembly 18 constructed according to principles of the present disclosure includes a membrane layer prepared from a formulation comprising an antimicrobial agent and/or anti-fungal agent, including, but not limited to, one selected from 2-(4-thiazolyl) benzimidazole, silver zeolyte, zinc oxide and zinc pyrithione. An antimicrobial/anti-fungal agent can be used in various amounts in the formulation of the fluid composition, including from about 1 to about 10% by weight or from about 3 to about 7% by weight, for example.

In embodiments, a cementitious panel 10 with an air/water barrier membrane assembly 18 constructed according to principles of the present disclosure includes a membrane layer prepared from a formulation comprising a pigment. Various pigments can be used, including chemical compounds that provide a black, brown, blue, green, red, yellow, orange or white pigment.

In embodiments, a cementitious panel 10 with an air/water barrier membrane assembly 18 constructed according to principles of the present disclosure includes a plurality of membrane layers prepared from a formulation with a suitable polymer as described above and at least one of the following additives: petroleum asphalt, limestone, calcium carbonate, kaolin clay, mica, heavy spar, talc, sand, quartz flour, chalk, titanium dioxide, silica, fly ash, gypsum, or a combination of at least two of these additives. In embodiments, the aggregate of the non-polymeric materials can be in different amounts, including in an amount from 20 to 80% by weight; from 25 to 75% by weight, and from 30 to 60% by weight, for example. In embodiments, a cementitious panel 10 with an air/water barrier membrane assembly 18 constructed according to principles of the present disclosure includes at least two membrane layers 21, 22 prepared from a formulation including a polyacrylate and at least one of the following additives: petroleum asphalt, limestone, calcium carbonate, kaolin clay, mica, heavy spar, talc, sand, quartz flour, chalk, titanium dioxide, silica, fly ash, gypsum, or a combination of at least two of these additives.

In embodiments, a cementitious panel 10 with an air/water barrier membrane assembly 18 constructed according to principles of the present disclosure includes a plurality of membrane layers prepared from a commercially-available fluid composition. Examples of commercially-available fluid compositions for fluid-applied air/water barrier membranes include those marketed under the trade names: EXOAIR™ (Tremco), TYVEK™ (DuPont), R-GUARD™ (Prosoco), AIR-SHIELD™ (W. R. Meadows), STO-GUARD™ (Sto Corp.), and AIR BLOC™ (Henry Co.). In some embodiments, a cementitious panel 10 with an air/water barrier membrane assembly 18 constructed according to principles of the present disclosure includes a membrane layer prepared from a formulation as described in U.S. Patent Application Publication No. US2014/0272404, which is hereby incorporated herein by this reference.

In some embodiments, a cementitious panel 10 with an air/water barrier membrane assembly 18 constructed according to principles of the present disclosure is manufactured by a method that controls an aggregate thickness of the membrane assembly 18. The thickness can be controlled such that a cementitious panel 10 with an air/water barrier membrane assembly 18 constructed according to principles of the present disclosure reduces air infiltration/exfiltration and water penetration through the panel. In embodiments, a cementitious panel 10 with an air/water barrier membrane assembly 18 constructed according to principles of the present disclosure reduces air infiltration/exfiltration and water penetration through the panel by at least 50%, by at least 70% in other embodiments, and by at least 80% in still other embodiments.

In embodiment, a cementitious panel 10 with an air/water barrier membrane assembly 18 constructed according to principles includes a release layer applied to the exterior surface of the membrane assembly 18. In embodiments, the release layer is at least partially embedded in the membrane assembly 18. In embodiments, the release layer can be made from any suitable material that can be embedded in the membrane assembly 18 to help prevent stacked cementitious panels 10 from adhering (blocking) to one another. Given the rubberized nature of embodiments of the membrane assembly, the exterior surface of the membrane assembly 18 can remain tacky, even after drying the outer layer 23. As a result, a release layer that prevents adjacent cementitious panels 10 from coming into full contact with each other can be used to prevent adhesion and/or damage to the stacked panels 10.

In embodiment, the release layer comprises an open weave mesh. The mesh can be prepared from any suitable material. For example, the mesh can comprise a natural or synthetic material (e.g., fiber), such as cotton, jute, sisal, wool, hemp, flax, bamboo, linen, glass, metal, nylon, polyethylene, polypropylene, acrylic, polyester, carbon fiber, and combinations thereof. In embodiments, the mesh material can have certain properties, such as fire-resistance, mold-resistance, water-resistance, and/or alkali-resistance, which are either intrinsic to the material or the result of a chemical additive and/or treatment.

Referring to FIG. 3, an embodiment of a system 50 for manufacturing a cementitious panel constructed in accordance with principles of the present disclosure is shown. In embodiments, the cementitious panel manufacturing system 50 can be used to produce a cementitious panel following principles of the present disclosure which panel includes a cementitious core, a cover sheet contiguous with the cementitious core, and an air/water barrier membrane assembly integrally connected to the cover sheet such that the cover sheet is interposed between the cementitious core and the air/water barrier membrane assembly. The air/water barrier membrane assembly includes a plurality of layers in a stacked arrangement. The illustrated cementitious panel manufacturing system 50 includes a conveyor 52, a board infeed station 53, a first layer production subassembly 54, a second layer production subassembly 55, a third layer production subassembly 56, and a stacker 59.

The conveyor 52 is adapted to convey the cementitious panel along a machine direction (indicated by the arrow heads in FIG. 3) from the board infeed station 53 through the layer production subassemblies 54, 55, 56 and to the stacker 59. Moving along the machine direction, the conveyor 52 includes a board infeed position 71, a first applicator station 72, a first dryer section 73, a first cooling section 74, a second applicator station 75, a second dryer section 76, a second cooling section 77, a third applicator station 78, a third dryer section 79, a third cooling section 80, and a stacking position 81. The conveyor 52 is adapted to move the cementitious panel from the board infeed position 71 to the first applicator station 72 and through the layer production subassemblies 54, 55, 56 to the stacking position 81. The layer production subassemblies 54, 55, 56 are interposed between the board infeed position 71 and the stacking position 81.

As shown in FIG. 3, in embodiments, the lengths of the dryer and cooling sections 73, 74, 76, 77, 79, 80 can be varied to adjust the amount of time the cementitious panel 10 is subjected to the drying or cooling conditions of a particular layer production subassembly 54, 55, 56. In other words, the length of a particular section correlates to the amount of time the cementitious panel 10 will spend in that particular section.

In the illustrated embodiment, the conveyor speed is sixty feet per minute such that the cementitious panel 10 spends thirty seconds in a section that is thirty feet long, sixty seconds in a section that is sixty feet long, ninety seconds in a section that is ninety feet long, etc. In the illustrated embodiment, the various lengths of the different parts of the system 50 are noted in FIG. 3 (e.g., a portion indicated as "30 sec./30 ft." is thirty feet long, as "60 sec./60 ft." is sixty feet long, and as "90 sec./90 ft." is 90 feet long, etc.). In embodiments, the amount of time the cementitious panel 10 spends in a given section can be varied by adjusting the length of the particular section and/or changing the conveyor speed. In embodiments, the length of one or more of the dryer and cooling sections 73, 74, 76, 77, 79, 80 can be different from those of the embodiment of FIG. 3.

In embodiments, the conveyor 52 can have a linear configuration such that the machine direction extends along a single axis. In other embodiments, the conveyor 52 can have different configurations, such as, for example, a straight-line configuration, a serpentine configuration (such as is shown in FIG. 3, for example), an L-shaped layout, a U-shaped layout, or any other suitable configuration suitable for its intended environment.

The board infeed station 53 is adapted to receive and hold cementitious panels that are ready to have the air/water barrier membrane assembly integrally applied thereto. The cementitious panels that are housed at the board infeed station 53 can be constructed according to any suitable method as described above.

The first, second, and third layer production subassemblies 54, 55, 56 are adapted to produce the air/water barrier membrane assembly which includes three membrane layers. In other embodiments, the system 50 can be used to produce an air/water barrier membrane assembly that has a different number of layers and can include a corresponding number of layer production subassemblies.

The first layer production subassembly 54 includes a first applicator 91, a first dryer 92, and a first cooler 93. The first applicator 91 is positioned at the first applicator station 72 and is adapted to apply a first layer of fluid composition to the cover sheet of the cementitious panel. In embodiments, the first applicator 91 can comprise any suitable equipment adapted to apply the first layer of fluid composition to the cementitious panel. For example, in embodiments, the first applicator 91 comprises a suitable roll coater assembly as is known to those skilled in the art.

The first dryer 92 is positioned downstream of the first applicator station 72 along the machine direction at the first dryer section 73. The first dryer 92 has a first infrared emitter system adapted to dry the first layer of fluid composition to form a first membrane layer.

In embodiments, the first dryer 92 comprises a hybrid infrared heating system. In the illustrated embodiment, the first dryer section 73 includes a first zone 95 and a second zone 97. The second zone 97 is disposed downstream of the first zone 95 along the machine direction. In the illustrated embodiment, the first infrared emitter system has a first infrared emitter subassembly 98 disposed in the first zone 95 and a second infrared emitter subassembly 99 disposed in the second zone 97. The first infrared emitter subassembly 98 has a first power density maximum operational value, and the second infrared emitter subassembly 99 has a second power density maximum operational value. In embodiments, the second power density maximum operational value is different from the first power density maximum operational value. In the illustrated embodiment, the first power density maximum operational value is greater than the second power density maximum operational value.

In embodiments, a ratio of the first power density maximum operational value to the second first power density maximum operational value is greater than 1.5. In embodiments, a ratio of the first power density maximum operational value to the second first power density maximum operational value is in a range between 1 and 2, and in a range between 1.5 and 2 in yet other embodiments.

In the illustrated embodiment, the first infrared emitter subassembly 98 is adapted to generate a medium-wave infrared emission spectra. In embodiments, the first infrared emitter subassembly 98 is adapted to generate a medium-wave infrared emission spectra which emits a maximum wavelength in a medium wave range from 2.3 μm to 3.3 μm, and from 2.3 μm to 2.8 μm in other embodiments. In embodiments, the first infrared emitter subassembly 98 comprises any suitable equipment, including commercially-available infrared emitter systems adapted to generate a medium-wave infrared emission spectra, as will be understood by one skilled in the art.

In the illustrated embodiment, the
In the illustrated embodiment, the first infrared emitter subassembly 98 comprises an electric infrared heater. In embodiments, the first infrared emitter subassembly 98 comprises any suitable equipment, including commercially-available electric infrared emitter systems adapted to generate a medium-wave infrared emission spectra, as will be understood by one skilled in the art. In embodiments, the first infrared emitter subassembly 98 comprises an electric infrared emitter system adapted to generate a medium-wave infrared emission spectra in which each resistive heating element is housed within a quartz tube.

In the illustrated embodiment, the second infrared emitter subassembly 99 is adapted to generate a long-wave infrared emission spectra. In embodiments, the second infrared emitter subassembly 99 is adapted to generate a long-wave infrared emission spectra which emits a maximum wavelength in a long wave range from 3.3 μm to 10 μm, 3.3 μm to 7 μm in other embodiments, and 3.3 μm to 6 μm in still other embodiments. In embodiments, the second infrared emitter subassembly 99 comprises any suitable equipment, including commercially-available infrared emitter systems adapted to generate a long-wave infrared emission spectra, as will be understood by one skilled in the art.

In the illustrated embodiment, the second infrared emitter subassembly 99 comprises a gas catalytic infrared heater. In embodiments, the second infrared emitter subassembly 99 comprises any suitable equipment, including commercially-available gas catalytic infrared emitter systems adapted to generate a long-wave infrared emission spectra, as will be understood by one skilled in the art. In embodiments, the second infrared emitter subassembly 99 comprises a gas catalytic infrared emitter system adapted to generate a long-wave infrared emission spectra in which each catalyst is in a glass fiber blanket.

In embodiments, the gas catalytic infrared emitter subassembly 99 has reduced capital costs and reduced energy costs relative to a comparable infrared emitter subassembly. In embodiments, the gas catalytic infrared emitter subassembly 99 can be more efficient at heating the first layer 21 of the fluid composition and does not heat the cementitious core as much (relative to a comparable electric infrared emitter arrangement). Without being bound by any particular theory, it is believed that the long wavelength emission spectra of the gas catalytic infrared emitter subassembly 99 has a smaller penetration depth as compared to a medium wavelength emission spectra, thereby heating the cementitious core 14 less than if the second infrared emitter subassembly used a medium-wave emission spectra with a similar power density. By heating the cementitious core 14 less, the system 50 helps reduce the amount of subsequent cooling of the cementitious panel 10 to ready the panel 10 for the next layer 22 of fluid composition for a more efficient process and helps reduce the deleterious effects of excessive heat applied to the cementitious core 14.

The first cooler 93 is positioned along the conveyor 52 between the first dryer 92 and a second applicator 101 of the second layer production subassembly 55 along the machine direction. The first cooler 93 is adapted to reduce the surface temperature of the cementitious panel.

In embodiments, the first cooler 93 can comprise any suitable cooling equipment suitable for cooling the first membrane layer 21 to help reduce the surface temperature of the cementitious panel 10 and to draw heat away from the cementitious core 14 thereof. In the illustrated embodiment, the first cooler 93 comprises a convective cooling chamber having a fan adapted to direct a flow of air impinging across the first membrane layer 21. In embodiments, the convective cooling chamber 93 uses a supply of air for impinging across the first membrane layer 21 that comprises air at a temperature that is less than an ambient air temperature adjacent the first cooler 93. In embodiments, the convective cooling chamber 93 uses a supply of air for impinging across the first membrane layer 21 that comprises air at a humidity level that is less than an ambient humidity level adjacent the first cooler 93.

The second layer production subassembly 55 includes the second applicator 101, a second dryer 102, and a second cooler 103. The second applicator 101 is positioned at the second applicator station 75 downstream of the first dryer section 73 along the machine direction and is adapted to apply a second layer 22 of fluid composition over the first membrane layer 21. In embodiments, the second applicator 101 can have a similar construction as that of the first applicator 91.

The second dryer 102 is positioned downstream of the second applicator station 75 along the machine direction at the second dryer section 76. The second dryer 102 has a second infrared emitter system 109 adapted to dry the second layer of fluid composition to form the second membrane layer 22.

In embodiments, the second infrared emitter system 109 has a third power density maximum operational value, and the third power density maximum operational value is less than the first power density maximum operational value. In embodiments, the second power density maximum operational value and the third power density maximum operational value are both less than the first power density maximum operational value. In embodiments, the third power density maximum operational value is substantially the same as the second power density maximum operational value.

The second cooler 103 is positioned along the conveyor 52 adjacent a downstream end 105 of the second dryer 102 along the machine direction. The second cooler 103 is adapted to reduce the surface temperature of the cementitious panel. In embodiments, the second cooler 103 can have a construction that is similar to the construction of the first cooler 93. In embodiments, the second cooler 103 can be adapted to cool the cementitious panel 10 such that at least one surface of the cementitious panel is below a maximum temperature amount before the third layer 23 of fluid composition is applied of the second membrane layer 22.

The third layer production subassembly 56 includes a third applicator 111, a third dryer 112, and a third cooler 113. The third applicator 111 is positioned at the third applicator station 78 and is adapted to apply a third layer 23 of fluid composition over the second membrane layer 22. In embodiments, the third applicator 111 can have a similar construction as that of the first applicator 91 and the second applicator 101.

The third dryer 112 is positioned downstream of the third applicator station 78 along the machine direction at the third dryer section 79. The third dryer 112 has a third infrared emitter system 119 adapted to dry the third layer of fluid composition to form a third membrane layer 23.

In embodiments, the third infrared emitter system 119 has a fourth power density maximum operational value. In embodiments, the fourth power density maximum operational value is less than the first power density maximum operational value. In the illustrated embodiment, the fourth power density maximum operational value is substantially the same as the third power density maximum operational value.

In embodiments, the third infrared emitter system 119 is adapted to generate a long-wave infrared emission spectra. The illustrated third infrared emitter system 119 comprises a gas catalytic infrared heater. In the illustrated embodiment, the third infrared emitter system 119 has substantially the same construction as the second infrared emitter system 118.

The third cooler 113 is positioned along the conveyor 52 adjacent a downstream end 115 of the third dryer 112 along the machine direction. The third cooler 113 is adapted to reduce the surface temperature of the cementitious panel. In embodiments, the third cooler 113 can be adapted to cool the cementitious panel 10 such that at least one surface of the cementitious panel is below a maximum temperature amount before the cementitious panel 10 is placed in a stacking arrangement at the stacker 59.

The stacker 59 is positioned at the stacking position. The stacker 59 is adapted to receive the cementitious panel from the portion of the conveyor 52 leading from the third cooler 113. The stacker 59 is adapted to support the cementitious panel 10 such that a series of cementitious panels can be placed in stacking arrangement at the stacking position. In embodiments, the stacker 59 can comprise any suitable stacking equipment as is known to those skilled in the art.

In embodiments of a method of manufacturing a cementitious panel following principles of the present disclosure, a cementitious panel manufacturing system constructed according to principles of the present disclosure is used to make a cementitious panel with an air/water barrier membrane assembly having a plurality of layers in a stacked arrangement as discussed herein. In embodiments, a method of manufacturing a cementitious panel following principles of the present disclosure can be used with any embodiment of a system for manufacturing a cementitious panel according to principles discussed herein.

Further embodiments provide a method for manufacturing a cementitious panel with an air/water barrier membrane assembly. The method includes steps of preparing a cementitious slurry and fabricating a cementitious panel with at least one cover sheet. After the cementitious slurry is set to form the cementitious core, the cementitious panel is coated with an air/water barrier membrane assembly comprising a plurality of successively applied membrane layers. In some embodiments, a cementitious panel is fabricated by sandwiching a cementitious slurry comprising gypsum between two fiberglass mats. After the cementitious panel is set, an air/water barrier membrane assembly is applied thereto in successive layers of fluid composition using a suitable formulations discussed herein. Each layer of fluid composition can be dried using an infrared heating to help form the membrane layer. After the membrane layer is applied to the cementitious panel, it can be subjected to cooling conditions to ready the cementitious panel for the application of another layer of fluid composition to build up the aggregate thickness of the membrane assembly and/or to ready the cementitious panel for stacking in the stacker.

In embodiments of a method of manufacturing a cementitious panel following principles of the present disclosure, the method includes applying, at a first application station, a first layer of fluid composition to a cover sheet of the cementitious panel. The first layer is subjected to drying conditions via infrared heating in a first drying section with a first power density profile to form a first membrane layer. In embodiments, between subjecting the first layer to drying conditions via infrared heating in the first drying section and applying a second layer of fluid composition over the first membrane layer at the second application station, the cementitious panel is subjected to cooling conditions in a first cooling section to reduce a surface temperature of the cementitious panel.

In embodiments, a second layer of fluid composition is applied, at a second application station, over the first membrane layer. The second application station is disposed in spaced relationship to the first application station with the first drying zone interposed therebetween. The second layer is subjected to drying conditions via infrared heating in a second drying section with a second power density profile to form a second membrane layer. The second power density profile is different from the first power density profile. In embodiments, between subjecting the second layer to drying conditions via infrared heating in the second drying section and applying a third layer of fluid composition over the second membrane layer at the third application station, the cementitious panel can be subjected to cooling conditions in a second cooling section to reduce a surface temperature of the cementitious panel.

In embodiments, at a third application station, a third layer of fluid composition is applied over the second membrane layer. In embodiments, the third application station is disposed in spaced relationship to the second application station with the second drying zone interposed therebetween. The third layer is subjected to drying conditions via infrared heating in a third drying section with a third power density profile to form a third membrane layer. In embodiments, the third power density profile is different from the first power density profile. In embodiments, after subjecting the third layer to drying conditions via infrared heating in the third drying section, the cementitious panel can be subjected to cooling conditions in a third cooling section to reduce a surface temperature of the cementitious panel. The cementitious panel can be placed in a stacking position at a stacking station.

In embodiments, applying the layers of fluid composition can be performed using any suitable technique. In embodiments, applying each layer of fluid composition to the cover sheet is performed via at least one of spray coating, roll coating, and flood coating. In some embodiments, each layer of fluid composition is applied in substantially the same manner (e.g., via roll coating).

In embodiments, subjecting the first layer to drying conditions comprises conveying the cementitious panel through a first zone and then a second zone of the first drying section. The first zone can have a first power density, and the second zone can have a second power density which is different from the first power density. In embodiments, the second drying section has a third zone with a third power density, and the third power density being different from the first power density. In embodiments, the third drying section has a fourth zone with a fourth power density, which is different from the first power density. In embodiments, the first power density is greater than the second power density, and the second power density is greater than both the third power density and the fourth power density. In embodiments, the third power density is substantially equal to the fourth power density.

In embodiments, drying conditions in the first zone are produced via electric infrared heating and drying conditions in the second zone are produced via gas catalytic infrared heating. In embodiments, drying conditions in both the second zone of the first drying section and the third zone of the second drying section are produced via gas catalytic infrared heating. In embodiments, drying conditions in both the second zone of the first drying section, the third zone of the second drying section, and the fourth zone of the third drying section are produced via gas catalytic infrared heating.

In embodiments, the first zone has a medium-wave infrared emission spectra, and the second zone has a long-wave infrared emission spectra. In embodiments, the first zone has a medium-wave infrared emission spectra, and the second zone and the third zone both have a long-wave infrared emission spectra. In embodiments, the first zone has a medium-wave infrared emission spectra, and the second zone, the third zone, and the fourth zone all have a long-wave infrared emission spectra.

In embodiments, the first power density is greater than the second power density. In embodiments, the first power density is greater than both the second power density and the third power density. In embodiments, the second power density is different from the third power density. In embodiments, the second power density is greater than the third power density. In embodiments, a ratio of the first power density to the second power density is greater than 1.5. In embodiments, a ratio of the first power density to the second power density is in a range between 1.5 and 2.

In embodiments, the cementitious panel resides in the first zone for a first period of time, in the second zone for a second period of time which is different from the first period of time, in the third zone for a third period of time which is also different from the first period of time, and in the fourth zone for a fourth period of time which is also different from the first period of time. In embodiments, the second period of time is greater than the first period of time. In embodiments, the second period of time and the third period of time are both greater than the first period of time. In embodiments, the second period of time, the third period of time, and the fourth period of time are each greater than the first period of time. In embodiments, a sum of the first period of time and the second period of time is about equal to the third period of time. In embodiments, a sum of the first period of time and the second period of time is about equal to the third period of time, and the third period of time is about equal to the fourth period of time.

In embodiments, a ratio of the second period of time to the first period of time is greater than 1.5. In embodiments, a ratio of the second period of time to the first period of time is in a range between 1.5 and 3, and in a range between 1.5 and 2.5 in other embodiments. In one embodiment, a ratio of the second period of time to the first period of time is about 2.

In embodiments, subjecting a given membrane layer to cooling conditions can comprise producing cooling conditions via convective cooling via a flow of air impinging across the given membrane layer. In embodiments, the flow of air impinging across the particular membrane layer comprises air at a temperature that is less than an ambient air temperature adjacent the particular cooling section. In embodiments, the flow of air impinging across the particular membrane layer comprises air at a humidity level that is less than an ambient humidity level adjacent the given cooling section.

There are many advantages to a method described above. When performed under controlled conditions including constantly monitored and maintained operating parameters, the method produces an cementitious panel with an air/water barrier membrane assembly with the consistent thickness, uniformity and even adhesive bond of the membrane assembly to the cementitious panel in an abbreviated production time relative to a manufacturing technique in which the membrane would be applied in a single layer of the aggregate thickness of the membrane assembly.

Any of the cementitious panels described herein can be assembled as part of a building system by being fastened (e.g., a screw, a nail) to a suitable framing structure (e.g., one or more wall studs or ceiling joists) with the integrated air/water barrier membrane comprising an outward-facing surface. Two adjacent panels can be joined at the seams using any suitable technique, such as by applying a suitable joint tape and joint compound and/or by applying a suitable caulk therebetween. If desired, an additional flashing layer can be added as a further air and water barrier. A cladding material (e.g., siding, shingle, and stone) can be further adhered to the exterior-facing surface of the integrated panel. The entire system can be constructed to help inhibit the penetration of air and water through the panel to the interior of the structure.

EMBODIMENTS

Principles of the present disclosure are incorporated in the following embodiments:

Embodiment 1

A cementitious panel comprising: a cementitious core; a cover sheet, the cover sheet contiguous with the cementitious core; and an air/water barrier membrane assembly, the air/water barrier membrane assembly integrally connected to the cover sheet such that the cover sheet is interposed between the cementitious core and the air/water barrier membrane assembly, the air/water barrier membrane assembly including a plurality of dried layers in a stacked arrangement.

Embodiment 2

A system for manufacturing a cementitious panel, the cementitious panel including a cementitious core, a cover sheet contiguous with the cementitious core, and an air/water barrier membrane assembly integrally connected to the cover sheet such that the cover sheet is interposed between the cementitious core and the air/water barrier membrane assembly, the air/water barrier membrane assembly including a plurality of layers in a stacked arrangement, the system comprising: a conveyor, the conveyor adapted to convey the cementitious panel along a machine direction from a first applicator station to a stacking position, the conveyor including a first dryer section, a second applicator station, and a second dryer section disposed along the machine direction between the first applicator station and the stacking position; a first applicator, the first applicator positioned at the first applicator station and adapted to apply a first layer of fluid composition to the cover sheet; a first dryer, the first dryer positioned downstream of the first applicator station along the machine direction at the first dryer section, and the first dryer having a first infrared emitter system adapted to dry the first layer of fluid composition to form a first membrane layer; a second applicator, the second applicator positioned at the second applicator station downstream of the first dryer section along the machine direction and adapted to apply a second layer of fluid composition over the first membrane layer; a second dryer, the second dryer positioned downstream of the second applicator station along the machine direction at the second dryer section, the second dryer having a second infrared emitter system adapted to dry the second layer of fluid composition to form a second membrane layer; wherein the first dryer section includes a first zone and a second zone, the second zone disposed downstream of the first zone along the machine direction, and the first infrared emitter system having a first infrared emitter subassembly disposed in the first zone and a second infrared emitter subassembly disposed in the second zone, the first infrared emitter subassembly having a first power density maximum operational value, and the second infrared emitter subassembly having a second power density maximum operational value, the second power density maximum operational value being different from the first power density maximum operational value.

Embodiment 3

The system for manufacturing a cementitious panel according to embodiment 2, wherein the first power density maximum operational value is greater than the second power density maximum operational value.

Embodiment 4

The system for manufacturing a cementitious panel according to embodiment 2 or 3, wherein the first infrared emitter subassembly comprises an electric infrared heater, and the second infrared emitter subassembly comprises a gas catalytic infrared heater.

Embodiment 5

The system for manufacturing a cementitious panel according to embodiment 2 or 3, wherein the first infrared emitter subassembly is adapted to generate a medium-wave infrared emission spectra, and the second infrared emitter subassembly is adapted to generate a long-wave infrared emission spectra.

Embodiment 6

The system for manufacturing a cementitious panel according to embodiment 5, wherein the first infrared emitter subassembly comprises an electric infrared heater, and the second infrared emitter subassembly comprises a gas catalytic infrared heater.

Embodiment 7

The system for manufacturing a cementitious panel according to any one of embodiments 3-6, wherein the second infrared emitter system has a third power density maximum operational value, and the third power density maximum operational value is less than the first power density maximum operational value.

Embodiment 8

The system for manufacturing a cementitious panel according to any one of embodiments 2-7, further comprising: a first cooler, the first cooler positioned along the conveyor between the first dryer and the second applicator along the machine direction, and the first cooler adapted to reduce the surface temperature of the cementitious panel.

Embodiment 9

The system for manufacturing a cementitious panel according to embodiment 8, wherein the first cooler comprises a convective cooling chamber having a fan adapted to direct a flow of air impinging across the first membrane layer.

Embodiment 10

The system for manufacturing a cementitious panel according to embodiment 8 or 9, further comprising: a second cooler, the second cooler positioned along the conveyor adjacent a downstream end of the second dryer along the machine direction, and the second cooler adapted to reduce the surface temperature of the cementitious panel.

Embodiment 11

The system for manufacturing a cementitious panel according to any one of embodiments 2-10, wherein the conveyor includes a third applicator station and a third dryer section, disposed along the machine direction between the second dryer station and the stacking position, the system further comprising: a third applicator, the third applicator positioned at the third applicator station and adapted to apply a third layer of fluid composition over the second membrane layer; a third dryer, the third dryer positioned downstream of the third applicator station along the machine direction at the third dryer section, and the third dryer having a third infrared emitter system adapted to dry the third layer of fluid composition to form a third membrane layer; wherein the second infrared emitter system has a third power density maximum operational value, and the third infrared emitter system has a fourth power density maximum operational value, the third power density maximum operational value and the fourth power density maximum operational value being both less than the first power density maximum operational value.

Embodiment 12

The system for manufacturing a cementitious panel according to embodiment 11, wherein the third power density maximum operational value is substantially the same as the fourth power density maximum operational value.

Embodiment 13

The system for manufacturing a cementitious panel according to embodiment 11 or 12, wherein the first infrared emitter subassembly is adapted to generate a medium-wave infrared emission spectra, and the second infrared emitter subassembly, the second infrared emitter system, and the third infrared emitter system are each adapted to generate a long-wave infrared emission spectra.

Embodiment 14

The system for manufacturing a cementitious panel according to any one of embodiments 11-13, wherein the first infrared emitter subassembly comprises an electric infrared heater, and the second infrared emitter subassembly, the second infrared emitter system, and the third infrared emitter system each comprises a gas catalytic infrared heater.

Embodiment 15

The system for manufacturing a cementitious panel according to any one of embodiments 11-14, further comprising: a third cooler, the third cooler positioned along the conveyor adjacent a downstream end of the third dryer along the machine direction, and the third cooler adapted to reduce the surface temperature of the cementitious panel.

Embodiment 16

The system for manufacturing a cementitious panel according to embodiment 15, further comprising: a stacker, the stacker positioned at the stacking position, and the stacker adapted to receive the cementitious panel from the portion of the conveyor leading from the third cooler, the stacker adapted to support the cementitious panel such that a series of cementitious panels can be placed in stacking arrangement at the stacking position.

Embodiment 17

A method of manufacturing a cementitious panel, the cementitious panel including a cementitious core and a cover sheet contiguous with the cementitious core, the method comprising: applying, at a first application station, a first layer of fluid composition to the cover sheet; subjecting the first layer to drying conditions via infrared heating in a first drying section with a first power density profile to form a first membrane layer; applying, at a second application station, a second layer of fluid composition over the first membrane layer, the second application station being disposed in spaced relationship to the first application station with the first drying zone interposed therebetween; subjecting the second layer to drying conditions via infrared heating in a second drying section with a second power density profile to form a second membrane layer, the second power density profile being different from the first power density profile.

Embodiment 18

The method of manufacturing a cementitious panel according to embodiment 17, wherein applying the first layer of fluid composition to the cover sheet at the first application station and applying the second layer of fluid composition to the first membrane layer at the second application station are performed via at least one of spray coating, roll coating, and flood coating.

Embodiment 19

The method of manufacturing a cementitious panel according to embodiment 17 or 18, wherein subjecting the first layer to drying conditions comprises conveying the cementitious panel through a first zone and then a second zone of the first drying section, the first zone having a first power density and the second zone having a second power density, the second power density being different from the first power density.

Embodiment 20

The method of manufacturing a cementitious panel according to any one of embodiments 17-19, wherein the first power density is greater than the second power density.

Embodiment 21

The method of manufacturing a cementitious panel according to embodiment 20, wherein a ratio of the first power density to the second power density is greater than 1.5.

Embodiment 22

The method of manufacturing a cementitious panel according to embodiment 20, wherein a ratio of the first power density to the second power density is in a range between 1.5 and 2.

Embodiment 23

The method of manufacturing a cementitious panel according to any one of embodiments 17-22, wherein drying conditions in the first zone are produced via electric infrared heating and drying conditions in the second zone are produced via gas catalytic infrared heating.

Embodiment 24

The method of manufacturing a cementitious panel according any one of embodiments 17-23, wherein the cementitious panel resides in the first zone for a first period of time, and the cementitious panel resides in the second zone for a second period of time, the second period of time being different from the first period of time.

Embodiment 25

The method of manufacturing a cementitious panel according to embodiment 24, wherein the second period of time is greater than the first period of time.

Embodiment 26

The method of manufacturing a cementitious panel according to embodiment 24, wherein a ratio of the second period of time to the first period of time is greater than 1.5.

Embodiment 27

The method of manufacturing a cementitious panel according to embodiment 24, wherein a ratio of the second period of time to the first period of time is in a range between 1.5 and 3.

Embodiment 28

The method of manufacturing a cementitious panel according to any one of embodiments 17-27, wherein subjecting the first layer to drying conditions comprises conveying the cementitious panel through a first zone and then a second zone of the first drying section, the first zone having a medium-wave infrared emission spectra and the second zone having a long-wave infrared emission spectra.

Embodiment 29

The method of manufacturing a cementitious panel according to embodiment 28, wherein drying conditions in the first zone are produced via electric infrared heating and drying conditions in the second zone are produced via gas catalytic infrared heating.

Embodiment 30

The method of manufacturing a cementitious panel according to embodiment 28 or 29, wherein the cementitious panel resides in the first zone for a first period of time, and the cementitious panel resides in the second zone for a second period of time, the second period of time being different from the first period of time.

Embodiment 31

The method of manufacturing a cementitious panel according to embodiment 30, wherein the second period of time is greater than the first period of time.

Embodiment 32

The method of manufacturing a cementitious panel according to embodiment 30, wherein a ratio of the second period of time to the first period of time is greater than 1.5.

Embodiment 33

The method of manufacturing a cementitious panel according to embodiment 30, wherein a ratio of the second period of time to the first period of time is in a range between 1.5 and 3.

Embodiment 34

The method of manufacturing a cementitious panel according to any one of embodiments 28-33, wherein subjecting the first layer to drying conditions comprises conveying the cementitious panel through a first zone and then a second zone of the first drying section, the first zone having a first power density and the second zone having a second power density, the second power density being different from the first power density.

Embodiment 35

The method of manufacturing a cementitious panel according to embodiment 34, wherein the first power density is greater than the second power density.

Embodiment 36

The method of manufacturing a cementitious panel according to any one of embodiments 17-35, further comprising: between subjecting the first layer to drying conditions via infrared heating in the first drying section and applying the second layer of fluid composition over the first membrane layer at the second application station, subjecting the cementitious panel to cooling conditions in a first cooling section to reduce a surface temperature of the cementitious panel.

Embodiment 37

The method of manufacturing a cementitious panel according to embodiment 36, wherein cooling conditions in the first cooling section are produced via convective cooling via a flow of air impinging across the first membrane layer.

Embodiment 38

The method of manufacturing a cementitious panel according to embodiment 37, wherein the flow of air impinging across the first membrane layer comprises air at a temperature that is less than an ambient air temperature adjacent the first cooling section.

Embodiment 39

The method of manufacturing a cementitious panel according to embodiment 37 or 38, wherein the flow of air impinging across the first membrane layer comprises air at a humidity level that is less than an ambient humidity level adjacent the first cooling section.

Embodiment 40

The method of manufacturing a cementitious panel according to any one of embodiments 17-39, wherein subjecting the first layer to drying conditions comprises conveying the cementitious panel through a first zone and then a second zone of the first drying section, the first zone having a first power density and the second zone having a second power density, the second power density being different from the first power density, and wherein the second drying section has a third zone with a third power density, the third power density being different from the first power density.

Embodiment 41

The method of manufacturing a cementitious panel according to embodiment 40, wherein the first power density is greater than the second power density.

Embodiment 42

The method of manufacturing a cementitious panel according to embodiment 40 or 41, wherein the second power density is greater than the third power density.

Embodiment 43

The method of manufacturing a cementitious panel according to any one of embodiments 40-42, wherein the first power density is greater than the second power density, and the first power density is greater than the third power density.

Embodiment 44

The method of manufacturing a cementitious panel according to embodiment 43, wherein the second power density is greater than the third power density.

Embodiment 45

The method of manufacturing a cementitious panel according to any one of embodiments 40-44, wherein drying conditions in the first zone of the first drying section are produced via electric infrared heating and drying conditions in both the second zone of the first drying section and the third zone of the second drying section are produced via gas catalytic infrared heating.

Embodiment 46

The method of manufacturing a cementitious panel according to any one of embodiments 40-45, wherein the cementitious panel resides in the first zone for a first period of time, in the second zone for a second period of time, and in the third zone for a third period of time, the second period of time and the third period of time both being different from the first period of time.

Embodiment 47

The method of manufacturing a cementitious panel according to embodiment 46, wherein the second period of time and the third period of time are both greater than the first period of time.

Embodiment 48

The method of manufacturing a cementitious panel according to embodiment 46 or 47, wherein a sum of the first period of time and the second period of time is about equal to the third period of time.

Embodiment 49

The method of manufacturing a cementitious panel according to any one of embodiments 17-48, wherein subjecting the first layer to drying conditions comprises conveying the cementitious panel through a first zone and then a second zone of the first drying section, the first zone having a medium-wave infrared emission spectra and the second zone having a long-wave infrared emission spectra, and subjecting the second layer to drying conditions comprises conveying the cementitious panel through a third zone of the second drying section, the third zone having a long-wave infrared emission spectra.

Embodiment 50

The method of manufacturing a cementitious panel according to embodiment 49, wherein drying conditions in the first zone are produced via electric infrared heating and drying conditions in both the second zone and the third zone are produced via gas catalytic infrared heating.

Embodiment 51

The method of manufacturing a cementitious panel according to any one of embodiments 17-50, further comprising: applying, at a third application station, a third layer of fluid composition over the second membrane layer, the third application station being disposed in spaced relationship to the second application station with the second drying zone interposed therebetween; subjecting the third layer to drying conditions via infrared heating in a third drying section with a third power density profile to form a third membrane layer, the third power density profile being different from the first power density profile.

Embodiment 52

The method of manufacturing a cementitious panel according to embodiment 51, wherein subjecting the first layer to drying conditions comprises conveying the cementitious panel through a first zone and then a second zone of the first drying section, the first zone having a first power density and the second zone having a second power density, the second power density being different from the first power density, wherein the second drying section has a third zone with a third power density, the third power density being different from the first power density, and wherein the third drying section has a fourth zone with a fourth power density, the fourth power density being different from the first power density.

Embodiment 53

The method of manufacturing a cementitious panel according to embodiment 52, wherein the first power density is greater than the second power density, and the second power density is greater than both the third power density and the fourth power density.

Embodiment 54

The method of manufacturing a cementitious panel according to embodiment 52 or 53, wherein the third power density is substantially equal to the fourth power density.

Embodiment 55

The method of manufacturing a cementitious panel according to any one of embodiments 52-54, wherein drying conditions in the first zone of the first drying section are produced via electric infrared heating and drying conditions in the second zone of the first drying section, the third zone of the second drying section, and the fourth zone of the third drying section are all produced via gas catalytic infrared heating.

Embodiment 56

The method of manufacturing a cementitious panel according to any one of embodiments 52-55, wherein the cementitious panel resides in the first zone for a first period of time, in the second zone for a second period of time, in the third zone for a third period of time, and in the fourth zone for a fourth period of time, the second period of time, the third period of time, and the fourth period of time each being different from the first period of time.

Embodiment 57

The method of manufacturing a cementitious panel according to embodiment 56, wherein the second period of time, the third period of time, and the fourth period of time are each greater than the first period of time.

Embodiment 58

The method of manufacturing a cementitious panel according to embodiment 56 or 57, wherein a sum of the first period of time and the second period of time is about equal to the third period of time, and the third period of time is about equal to the fourth period of time.

Embodiment 59

The method of manufacturing a cementitious panel according to any one of embodiments 51-58, wherein subjecting the first layer to drying conditions comprises conveying the cementitious panel through a first zone and then a second zone of the first drying section, the first zone having a medium-wave infrared emission spectra and the second zone having a long-wave infrared emission spectra, subjecting the second layer to drying conditions comprises conveying the cementitious panel through a third zone of the second drying section, the third zone having a long-wave infrared emission spectra, and subjecting the third layer to drying conditions comprises conveying the cementitious panel through a fourth zone of the third drying section, the fourth zone having a long-wave infrared emission spectra.

Embodiment 60

The method of manufacturing a cementitious panel according to embodiment 59, wherein drying conditions in the first zone are produced via electric infrared heating and drying conditions in each of the second zone, the third zone, and the fourth zone are produced via gas catalytic infrared heating.

Embodiment 61

The method of manufacturing a cementitious panel according to any one of embodiments 17-60, further comprising: between subjecting the second layer to drying conditions via infrared heating in the second drying section and applying the third layer of fluid composition over the second membrane layer at the third application station, subjecting the cementitious panel to cooling conditions in a second cooling section to reduce a surface temperature of the cementitious panel.

Embodiment 62

The method of manufacturing a cementitious panel according to embodiment 61, further comprising: after subjecting the third layer to drying conditions via infrared heating in the third drying section, subjecting the cementitious panel to cooling conditions in a third cooling section to reduce a surface temperature of the cementitious panel; placing the cementitious panel in a stacking position at a stacking station.

It shall be noted that the preceding are merely examples of embodiments according to principles of the present disclosure. Other exemplary embodiments are apparent from the entirety of the description herein. It will also be understood by one of ordinary skill in the art that each of these embodiments may be used in various combinations with the other embodiments provided herein.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the embodiments and claims herein) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for manufacturing a cementitious panel, the cementitious panel including a cementitious core, a cover sheet contiguous with the cementitious core, and an air/water barrier membrane assembly integrally connected to the cover sheet such that the cover sheet is interposed between the cementitious core and the air/water barrier membrane assembly, the air/water barrier membrane assembly including a plurality of layers in a stacked arrangement, the system comprising:
a conveyor, the conveyor adapted to convey the cementitious panel along a machine direction from a first applicator station to a stacking position, the conveyor including a first dryer section, a second applicator station, and a second dryer section disposed along the machine direction between the first applicator station and the stacking position;

a first applicator, the first applicator positioned at the first applicator station and adapted to apply a first layer of fluid composition to the cover sheet;

a first dryer, the first dryer positioned downstream of the first applicator station along the machine direction at the first dryer section, and the first dryer having a first infrared emitter system adapted to dry the first layer of fluid composition to form a first membrane layer;

a second applicator, the second applicator positioned at the second applicator station downstream of the first dryer section along the machine direction and adapted to apply a second layer of fluid composition over the first membrane layer;

a second dryer, the second dryer positioned downstream of the second applicator station along the machine direction at the second dryer section, the second dryer having a second infrared emitter system adapted to dry the second layer of fluid composition to form a second membrane layer;

wherein the first dryer section includes a first zone and a second zone, the second zone disposed downstream of the first zone along the machine direction, and the first infrared emitter system having a first infrared emitter subassembly disposed in the first zone and a second infrared emitter subassembly disposed in the second zone, the first infrared emitter subassembly having a first power density maximum operational value and being adapted to generate a medium-wave infrared emission spectra, and the second infrared emitter subassembly having a second power density maximum operational value and being adapted to generate a long-wave infrared emission spectra, the first power density maximum operational value being greater than the second power density maximum operational value.

2. The system for manufacturing a cementitious panel according to claim 1, wherein the first infrared emitter subassembly comprises an electric infrared heater, and the second infrared emitter subassembly comprises a gas catalytic infrared heater.

3. The system for manufacturing a cementitious panel according to claim 1, wherein the second infrared emitter system has a third power density maximum operational value, and the third power density maximum operational value is less than the first power density maximum operational value.

4. The system for manufacturing a cementitious panel according to claim 1, further comprising:

a first cooler, the first cooler positioned along the conveyor between the first dryer and the second applicator along the machine direction, and the first cooler adapted to reduce the surface temperature of the cementitious panel.

5. The system for manufacturing a cementitious panel according to claim 4, wherein the first cooler comprises a convective cooling chamber having a fan adapted to direct a flow of air impinging across the first membrane layer.

6. The system for manufacturing a cementitious panel according to claim 5, further comprising:

a second cooler, the second cooler positioned along the conveyor adjacent a downstream end of the second dryer along the machine direction, and the second cooler adapted to reduce the surface temperature of the cementitious panel.

7. The system for manufacturing a cementitious panel according to claim 6, wherein the conveyor includes a third applicator station and a third dryer section, disposed along the machine direction between the second dryer station and the stacking position, the system further comprising:

a third applicator, the third applicator positioned at the third applicator station and adapted to apply a third layer of fluid composition over the second membrane layer; a third dryer, the third dryer positioned downstream of the third applicator station along the machine direction at the third dryer section, and the third dryer having a third infrared emitter system adapted to dry the third layer of fluid composition to form a third membrane layer;

wherein the second infrared emitter system has a third power density maximum operational value, and the third infrared emitter system has a fourth power density maximum operational value, the third power density maximum operational value and the fourth power density maximum operational value being both less than the first power density maximum operational value;

wherein the first infrared emitter subassembly is adapted to generate a medium-wave infrared emission spectra, and the second infrared emitter subassembly, the second infrared emitter system, and the third infrared emitter system are each adapted to generate a long-wave infrared emission spectra.

8. The system for manufacturing a cementitious panel according to claim 7, further comprising:

a third cooler, the third cooler positioned along the conveyor adjacent a downstream end of the third dryer along the machine direction, and the third cooler adapted to reduce the surface temperature of the cementitious panel.

9. A system for manufacturing a cementitious panel, the cementitious panel including a cementitious core, a cover sheet contiguous with the cementitious core, and an air/water barrier membrane assembly integrally connected to the cover sheet such that the cover sheet is interposed between the cementitious core and the air/water barrier membrane assembly, the air/water barrier membrane assembly including a plurality of layers in a stacked arrangement, the system comprising:

a conveyor, the conveyor adapted to convey the cementitious panel along a machine direction from a first applicator station to a stacking position, the conveyor including a first dryer section, a second applicator station, and a second dryer section disposed along the machine direction between the first applicator station and the stacking position;

a first applicator, the first applicator positioned at the first applicator station and adapted to apply a first layer of fluid composition to the cover sheet;

a first dryer, the first dryer positioned downstream of the first applicator station along the machine direction at the first dryer section, and the first dryer having a first infrared emitter system adapted to dry the first layer of fluid composition to form a first membrane layer;

a second applicator, the second applicator positioned at the second applicator station downstream of the first dryer section along the machine direction and adapted to apply a second layer of fluid composition over the first membrane layer;

a second dryer, the second dryer positioned downstream of the second applicator station along the machine direction at the second dryer section, the second dryer having a second infrared emitter system adapted to dry the second layer of fluid composition to form a second membrane layer;

wherein the first dryer section includes a first zone and a second zone, the second zone disposed downstream of the first zone along the machine direction, and the first infrared emitter system having a first infrared emitter subassembly disposed in the first zone and a second infrared emitter subassembly disposed in the second zone, the first infrared emitter subassembly having a first power density maximum operational value, and the second infrared emitter subassembly having a second power density maximum operational value, the first power density maximum operational value being greater than the second power density maximum operational value;

wherein the second infrared emitter system has a third power density maximum operational value, and the third power density maximum operational value is less than the first power density maximum operational value.

10. The system for manufacturing a cementitious panel according to claim 9, wherein the first infrared emitter subassembly comprises an electric infrared heater adapted to generate a medium-wave infrared emission spectra, and the second infrared emitter subassembly comprises a gas catalytic infrared heater adapted to generate a long-wave infrared emission spectra.

11. The system for manufacturing a cementitious panel according to claim 9, further comprising:
a first cooler, the first cooler positioned along the conveyor between the first dryer and the second applicator along the machine direction, and the first cooler adapted to reduce the surface temperature of the cementitious panel.

12. The system for manufacturing a cementitious panel according to claim 11, further comprising:
a second cooler, the second cooler positioned along the conveyor adjacent a downstream end of the second dryer along the machine direction, and the second cooler adapted to reduce the surface temperature of the cementitious panel.

13. The system for manufacturing a cementitious panel according to claim 12, wherein the conveyor includes a third applicator station and a third dryer section, disposed along the machine direction between the second dryer station and the stacking position, the system further comprising:
a third applicator, the third applicator positioned at the third applicator station and adapted to apply a third layer of fluid composition over the second membrane layer; a third dryer, the third dryer positioned downstream of the third applicator station along the machine direction at the third dryer section, and the third dryer having a third infrared emitter system adapted to dry the third layer of fluid composition to form a third membrane layer;
wherein the second infrared emitter system has a third power density maximum operational value, and the third infrared emitter system has a fourth power density maximum operational value, the third power density maximum operational value and the fourth power density maximum operational value being both less than the first power density maximum operational value;
wherein the first infrared emitter subassembly is adapted to generate a medium-wave infrared emission spectra, and the second infrared emitter subassembly, the second infrared emitter system, and the third infrared emitter system are each adapted to generate a long-wave infrared emission spectra.

14. The system for manufacturing a cementitious panel according to claim 13, further comprising:
a third cooler, the third cooler positioned along the conveyor adjacent a downstream end of the third dryer along the machine direction, and the third cooler adapted to reduce the surface temperature of the cementitious panel.

15. A system for manufacturing a cementitious panel, the cementitious panel including a cementitious core, a cover sheet contiguous with the cementitious core, and an air/water barrier membrane assembly integrally connected to the cover sheet such that the cover sheet is interposed between the cementitious core and the air/water barrier membrane assembly, the air/water barrier membrane assembly including a plurality of layers in a stacked arrangement, the system comprising:
a conveyor, the conveyor adapted to convey the cementitious panel along a machine direction from a first applicator station to a stacking position, the conveyor including a first dryer section, a second applicator station, and a second dryer section disposed along the machine direction between the first applicator station and the stacking position;
a first applicator, the first applicator positioned at the first applicator station and adapted to apply a first layer of fluid composition to the cover sheet;
a first dryer, the first dryer positioned downstream of the first applicator station along the machine direction at the first dryer section, and the first dryer having a first infrared emitter system adapted to dry the first layer of fluid composition to form a first membrane layer;
a second applicator, the second applicator positioned at the second applicator station downstream of the first dryer section along the machine direction and adapted to apply a second layer of fluid composition over the first membrane layer;
a first cooler, the first cooler positioned along the conveyor between the first dryer and the second applicator along the machine direction, and the first cooler adapted to reduce the surface temperature of the cementitious panel, wherein the first cooler comprises a convective cooling chamber having a fan adapted to direct a flow of air impinging across the first membrane layer;
a second dryer, the second dryer positioned downstream of the second applicator station along the machine direction at the second dryer section, the second dryer having a second infrared emitter system adapted to dry the second layer of fluid composition to form a second membrane layer;
wherein the first dryer section includes a first zone and a second zone, the second zone disposed downstream of the first zone along the machine direction, and the first infrared emitter system having a first infrared emitter subassembly disposed in the first zone and a second infrared emitter subassembly disposed in the second zone, the first infrared emitter subassembly having a first power density maximum operational value, and the second infrared emitter subassembly having a second power density maximum operational value, the second power density maximum operational value being different from the first power density maximum operational value.

16. The system for manufacturing a cementitious panel according to claim 15, wherein the first power density maximum operational value is greater than the second power density maximum operational value.

17. The system for manufacturing a cementitious panel according to claim 16, wherein the first infrared emitter subassembly comprises an electric infrared heater, and the second infrared emitter subassembly comprises a gas catalytic infrared heater.

18. The system for manufacturing a cementitious panel according to claim 15, further comprising:
   a second cooler, the second cooler positioned along the conveyor adjacent a downstream end of the second dryer along the machine direction, and the second cooler adapted to reduce the surface temperature of the cementitious panel.

19. The system for manufacturing a cementitious panel according to claim 18, wherein the conveyor includes a third applicator station and a third dryer section, disposed along the machine direction between the second dryer station and the stacking position, the system further comprising:
   a third applicator, the third applicator positioned at the third applicator station and adapted to apply a third layer of fluid composition over the second membrane layer; a third dryer, the third dryer positioned downstream of the third applicator station along the machine direction at the third dryer section, and the third dryer having a third infrared emitter system adapted to dry the third layer of fluid composition to form a third membrane layer;
   wherein the second infrared emitter system has a third power density maximum operational value, and the third infrared emitter system has a fourth power density maximum operational value, the third power density maximum operational value and the fourth power density maximum operational value being both less than the first power density maximum operational value;
   wherein the first infrared emitter subassembly is adapted to generate a medium-wave infrared emission spectra, and the second infrared emitter subassembly, the second infrared emitter system, and the third infrared emitter system are each adapted to generate a long-wave infrared emission spectra.

20. The system for manufacturing a cementitious panel according to claim 19, further comprising:
   a third cooler, the third cooler positioned along the conveyor adjacent a downstream end of the third dryer along the machine direction, and the third cooler adapted to reduce the surface temperature of the cementitious panel.

* * * * *